Figure 1:
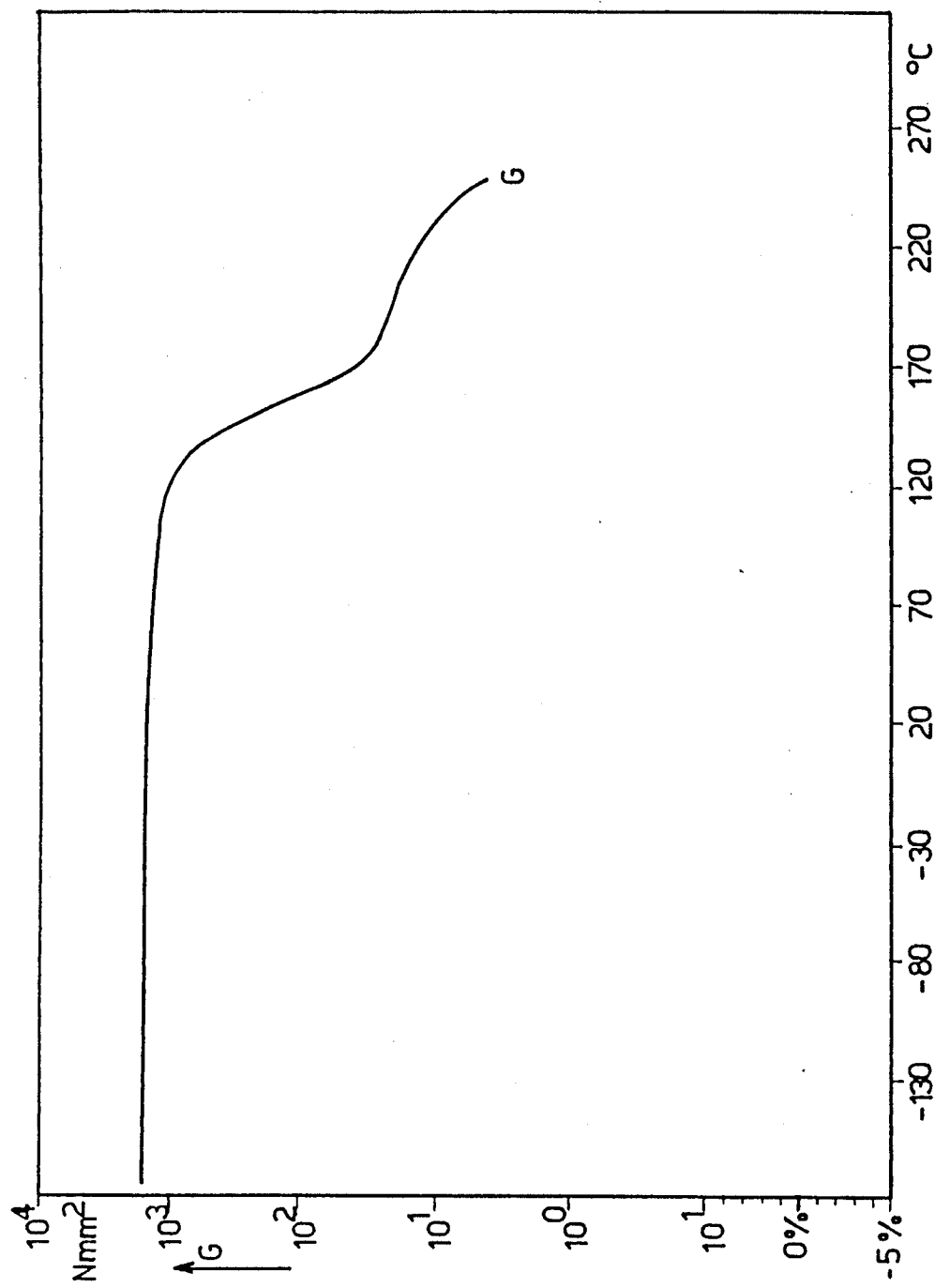

United States Patent [19]

Albizzati et al.

[11] Patent Number: 4,946,897

[45] Date of Patent: Aug. 7, 1990

[54] THERMOPLASTIC COMPOSITIONS BASED ON SYNDIOTACTIC POLYMERS OF STYRENE AND POLYPHENYLENE ETHERS

[75] Inventors: Enrico Albizzati, Arona; Italo Borghi, Ferrara; Franco Fattorini, Cavallasca; Giovanni Giunchi, Novara, all of Italy

[73] Assignee: Montedipe S.p.A., Milan, Italy

[21] Appl. No.: 261,228

[22] Filed: Oct. 24, 1988

[30] Foreign Application Priority Data

Oct. 28, 1987 [IT] Italy ............................ 22422 A/87

[51] Int. Cl.$^5$ .............................................. C08L 71/12
[52] U.S. Cl. .................................... 525/132; 525/151; 526/346
[58] Field of Search ....................... 525/132, 905, 151

[56] References Cited

U.S. PATENT DOCUMENTS 3,383,435  5/1968  Czek .................................. 525/152

Primary Examiner—Jacob Ziegler
Attorney, Agent, or Firm—Stevens, Davis, Miller & Mosher

[57] ABSTRACT

Compositions comprising from 5 to 50% by weight of a polyphenylene ether and from 95 to 50% by weight of a styrene polymer having a syndiotactic structure. Such compositions are endowed with enhanced mechanical properties compared to those containing amorphous polystyrene, or polystyrene having an isotactic structure.

11 Claims, 3 Drawing Sheets

THERMOPLASTIC COMPOSITIONS BASED ON SYNDIOTACTIC POLYMERS OF STYRENE AND POLYPHENYLENE ETHERS

DESCRIPTION OF THE INVENTION

The present invention relates to compositions of polyphenylene ethers with styrene polymers, endowed with improved mechanical characteristics. In particular, it relates to compositions of polyphenylene ethers with styrene polymers having a syndiotactic structure.

Polyphenylene ethers are a family of synthetic polymers well known in the art, and are disclosed, e.g., in U.S. Pat. No. 3,306,875. They have excellent properties, in particular with respect to mechanical and electrical properties, over a wide temperature range. However, they show a low impact strength, and the occurrence of cracking in solvents.

Many attempts have been made in the art to obviate such drawbacks, such as, e.g., blending polyphenylene ethers with amorphous styrene polymers in various proportions. According to U.S. Pat. No. 3,356,761, the polyphenylene ether is dissolved in monomeric styrene, which is subsequently polymerized into polystyrene, to produce a blend of both polymers.

Blends of polyphenylene ether with amorphous polystyrene, obtained by directly mixing the two polymers, are furthermore disclosed in U.S. Pat. Nos. 3,373,226 and 3,383,435.

In all the above cases, non-crystalline compositions were obtained which display unsatisfactory mechanical characteristics. In particular, such compositions show a sharp decrease of the elastic modulus at a temperature just above the glass transition temperature.

In accordance with the present invention, it has now been discovered that crystalline compositions of polyphenylene ether with styrene polymers may be obtained which are not affected by the above-mentioned drawbacks, if crystalline styrene polymers having an essentially syndiotactic structure are used in an amount within the range of from 50 to 95% by weight, based on their blends, with polyphenylene ether.

Therefore the present invention relates to compositions which comprise: from 95 to 50% by weight of at least one styrene polymer having an essentially syndiotactic structure; and from 5 to 50% by weight of one or more polyphenylene ether(s), relative to the sum of the weights of the styrene polymer and the polyphenylene ether.

The styrene polymers having an essentially syndiotactic structure are per se known products. Their preparation is disclosed in European patent application No. 87/118573 to Montedison, the contents of which in its entirety is incorporated herein by reference.

Such polymers are characterized by an H-NMR spectrum showing chemical shifts of methynic and methylenic protons, respectively centered at 1.9 and 1.4 ppm.

Furthermore such polymers, or their residues on extraction with methyl-ethyl-ketone, show, after melting and solidification, when subjected to x-ray analysis, the highest-intensity reflections corresponding to interplanar distances of 13.1 Å; 7.6 Å; 6.46 Å; 4.37 Å; and 2.58 Å.

By the term "essentially syndiotactic structure," as used in this application, it is to be understood that such a structure is present for at least long portions of the polymeric chains.

Preferably, the compositions of the present invention comprise from 60 to 90% by weight of at least one syndiotactic crystalline styrene polymer, and from 40 to 10% by weight of a polyphenylene ether, both based on the sum of the weights of the styrene polymers and of the polyphenylene ether.

The molecular weight of the styrene polymers having an essentially syndiotactic structure used for the compositions according to the present invention may range from 25,000 to 1,200,000 (weight average molecular weight "$M_w$"), but preferably it is from 100,000 to 800,000.

Syndiotactic styrene polymers having a melting temperature of at least 250° C., and, in particular, from 260° to 275° C., are preferred.

By "styrene polymers," according to the present invention, these should be understood as including not only styrene homopolymers, but, in general, also the homopolymers of monomers of the formula:

wherein: R=an alkyl-aryl group, or a halogen-substituted aryl group, containing from 6 to 20 carbon atoms; as well as styrene copolymers with such monomers, or with other ethylenically-unsaturated copolymerizable monomers, provided they have an essentially syndiotactic structure.

Among the preferred styrene polymers, besides polystyrene, syndiotactic poly-para methylstyrene, and styrene copolymers with para-methyl-styrene, having a syndiotactic structure, may be mentioned.

The polyphenylene ethers which are contained in the compositions of the present invention are polymers or copolymers comprising recurring units of the general formula:

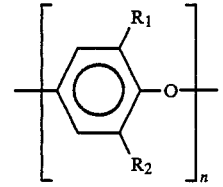

wherein the ether-oxygen of a unit is linked to the benzene ring of the adjacent unit, n is an integer larger than 50, $R_1$ and $R_2$, equal to or different from each other, are hydrogen atoms of halogen atoms, hydrocarbon radicals not containing tertiary carbon atoms in the alpha-position, halo-hydrocarbon radicals or halohydrocarboxy radicals containing at least two carbon atoms between the benzene ring and the halogen atom, and not containing tertiary carbon atoms in the alpha-position.

Preferred polyphenylene ethers are those where at least one of the $R_1$ and $R_2$ radicals is a alkyl group of from 1 to 4 carbon atoms. The most preferred polyphenylene ether is poly(2,6-dimethyl-1,4-phenylene)ether.

As mentioned above, within the definition of polyphenylene ether, copolymers are also included which are prevailingly formed by units having the formula shown above, obtained by copolymerizing phenol with alkyl-substituted-phenols, typical representatives of which are 2,3,6-trimethyl-phenol and 2,3,5,6-tetramethyl-phenol.

Furthermore, within that definition, come modified polyphenylene ethers, such as e.g., polyphenylene ethers modified with alkylbenzene/formaldehyde resins, comprising as the main block a block having a polyphenylene ether structure as defined above, and a block obtained by the reaction of an alkylbenzene/formaldehyde resin with an alkylphenol.

Finally, within said definition come those polyphenylene ethers which are obtained by grafting vinyl-aromatic monomers on polyphenylene ethers.

The compositions of the present invention may be obtained by blending methods which are customarily used in the field of thermoplastic polymers, such as extrusion, melting, dissolution followed by precipitation, and so forth.

The compositions may include plasticizers, such as mineral oils, phosphates or chlorinated bisphenols, in an amount generally from 5 to 15% based on the weight of the composition.

The following examples still further explain the present invention, without, however, limiting it.

EXAMPLE 1

To a reactor of 2 liters capacity, there were charged: (A) 150 cc of a solution at 10% weight of a polyphenylene ether (having an intrinsic viscosity $[\eta]=0.7$) in orthochlorobenzene, at a temperature of 135° C.; (B) 700 cc of a solution at 10% by weight of a crystalline polystyrene having an essentially syndiotactic structure (having $[\eta]1.3$), in ortho-chloro-benzene, at a temperature of 135° C. Such polystyrene had incorporated therein 0.3% weight of BHT and 0.1% by weight of Irganox 1076, and was prepared according to the process disclosed in European patent application No. 87/118573.

The mixture was kept stirred at 135° C. for 30 minutes, to perfectly homogenize said solutions with each other. The mixture was transferred by siphon into a 10liter flask equipped with a turbine stirrer of the Ultraturrax type, and containing 6 liters of ethanol, where the precipitation of the two polymers (as an intimate mutual blend) was obtained.

The polymer blend was filtered off and extracted with ethanol for 24 hours, to remove any trace of orthochlorobenzene. It was then dried at 130° C. under vacuum.

From the thus-obtained product, constituted by a blend of 70% by weight of polystyrene, and 30% by weight of polyphenylene ether, specimens for the dynamic-mechanical analysis and for the thermal characterization of the composition were produced by press-molding. The plot of FIG. 1 describes the dynamic-mechanical characteristics of the product.

The thermal analysis showed the following Vicat values:

| Vicat at 1 kg | higher than 145° C. |
|---|---|
| Vicat at 5 kg | 143° C. |

The Vicat values at 1 kg and 5 kg of the syndiotactic polystyrene as such, as used for the composition, were higher than 145° C.

EXAMPLE 2

Example 1 was repeated with the only difference being that 850 cc of syndiotactic polystyrene solution were used in place of 700 cc, and that 150 cc of polyphenylene ether solution were used in place of 300 cc.

In this way, a composition constituted by 85% by weight of polystyrene and 15% by weight of polyphenylene ether was obtained.

Figure 2:
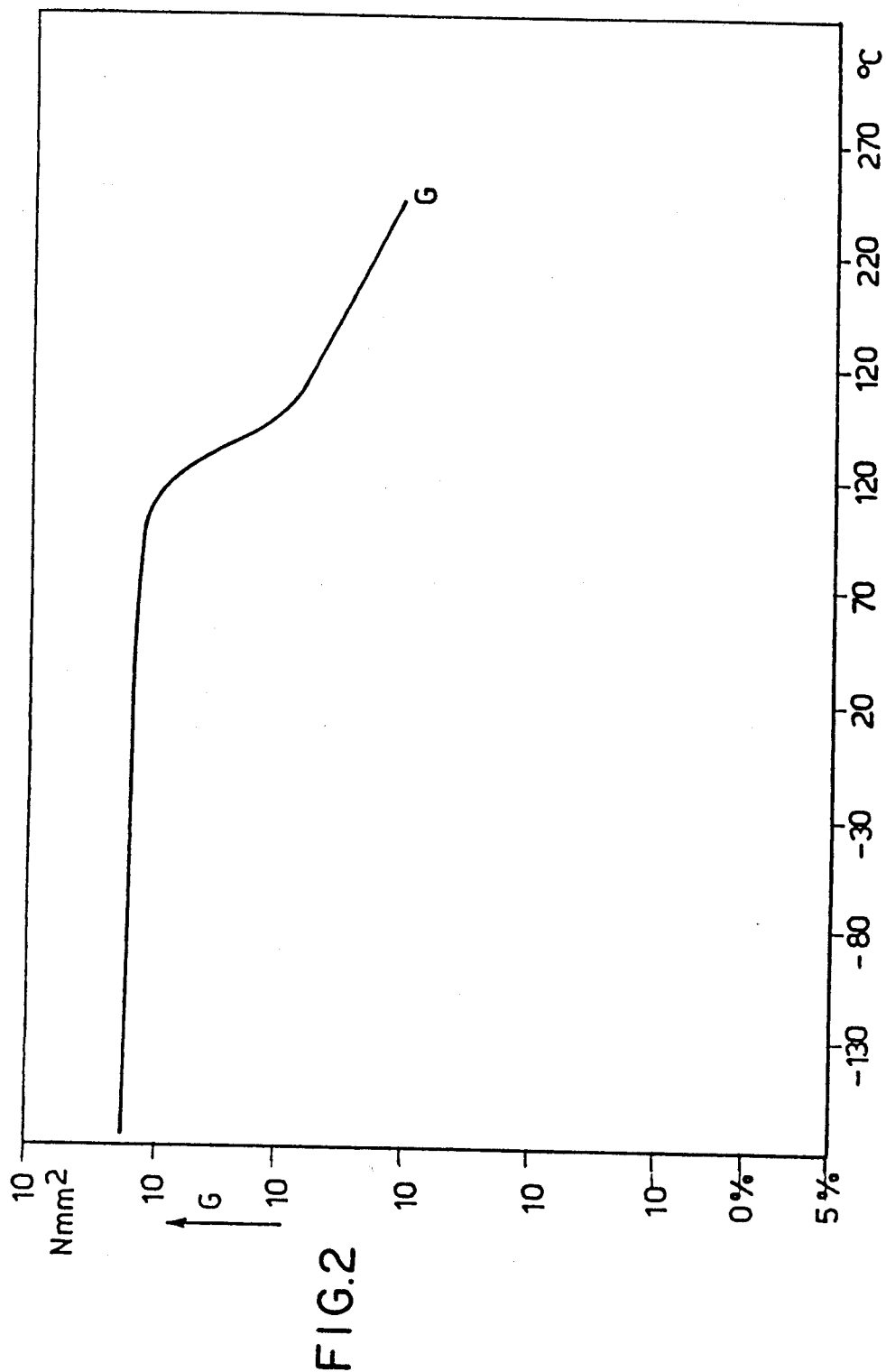

The plot of FIG. 2 shows the dynamic-mechanical characteristics of such composition.

EXAMPLE 3 (COMPARATIVE EXAMPLE)

By the same procedures as in Example 1, a composition was prepared which was constituted by 30% by weight of the same polyphenylene ether and 70% by weight of EDISTAR 1280 polystyrene (an amorphous polystyrene manufactured by MONTEDIPE) having $[\eta]=1.0$.

The analysis of the press-molded specimens obtained from such a composition supplied 1-kg and 5-kg Vicat values respectively of 118° C. and 114° C. The corresponding Vicat values of the polystyrene used were 100° C. and 95° C. respectively.

Figure 3:
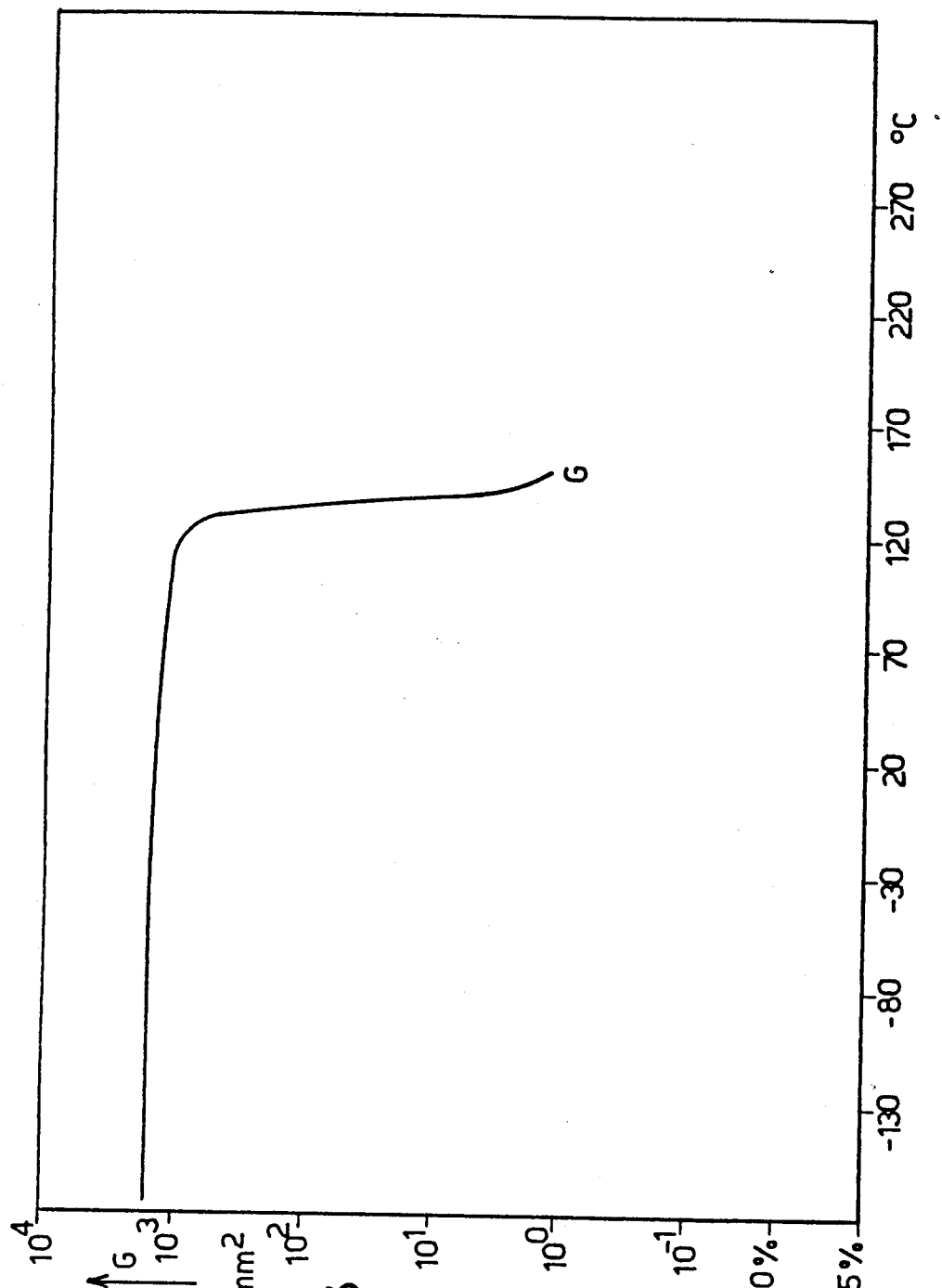

The plot of FIG. 3 shows the dynamic-mechanical characteristics of this composition.

By comparing the plots of FIGS. 1, 2 and 3, one can see that the elastic modulus of the composition containing amorphous polystyrene decreases by three orders of magnitude as soon as the temperature increases beyond the glass transition temperature of the composition (approximately 120° C.), while the modulus of the compositions containing syndiotactic polystyrene (FIGS. 1 and 2) decreases by only one order of magnitude in correspondence to that temperature, then decreasing slowly until the melting temperature is reached.

What is claimed is:

1. Compositions comprising: from 50 to 95% by weight of at least one styrene polymer having an essentially syndiotactic structure characterized by an H-NMR spectrum showing chemical shifts of methynic and methylenic protons respectively centered at 1.9 and 1.4 ppm; and from 50 to 5% by weight of at least one polyphenylene ether, with respect to the sum of the weights of the styrene polymer plus the polyethylene ether.

2. Compositions according to claim 1, comprising from 60 to 90% by weight of a styrene polymer, and from 40 to 10% by weight of polyphenylene ether.

3. Compositions according to claim 1 or 2, wherein the styrene polymer has a weight average molecular weight from 25,000 to 1,200,000, and preferably from 100,000 to 800,000.

4. Compositions according to claim 1 or 2, wherein the styrene polymer has a melting temperature of at least 250° C., and preferably from 260° to 275° C.

5. Compositions according to claim 1 or 2, wherein the styrene polymer is polystyrene.

6. Compositions according to claim 1 or 2, wherein the styrene polymer is poly-para-methyl-styrene.

7. Compositions according to claim 1 or 2, wherein the styrene polymer is a styrene/para-methyl-styrene copolymer.

8. Compositions according to claim 1 or 2, wherein the polyphenylene ether contains recurring units of the formula:

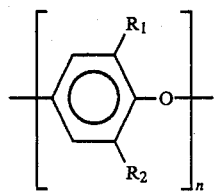

wherein the ether-oxygen of a unit is linked to the benzene ring of the adjacent unit, n is an integer larger than 50, $R_1$ and $R_2$, equal to or different from each other, are hydrogen atoms or halogen atoms, hydrocarbon radicals not containing tertiary carbon atoms in the alpha position, halo-hydrocarbon radicals or halohydrocarboxy radicals containing at least two carbon atoms between the benzene ring and the halogen atom, and not containing tertiary carbon atoms in the alpha-position.

9. Compositions according to claim 8, wherein at least one of the $R_1$ and $R_2$ radicals is an alkyl group containing from 1 to 4 carbon atoms.

10. Compositions according to claim 8, wherein the polyphenylene ether is poly(2,6-dimethyl-1,4-phenylene)ether.

11. Compositions according to claim 8 wherein the polyphenylene ether is poly(2,6-dimethyl-1,4-phenylene)ether.

* * * * *